United States Patent Office 3,325,681
Patented June 13, 1967

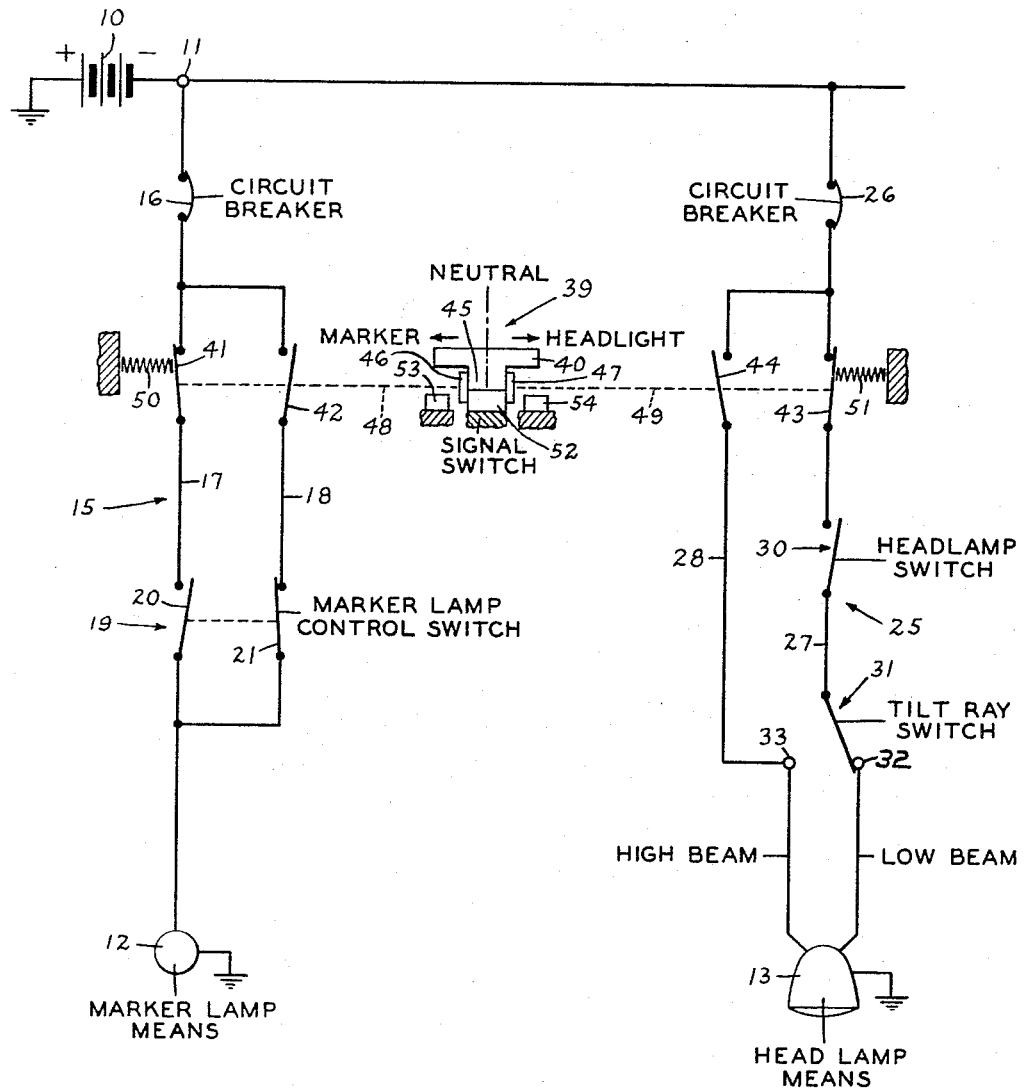

3,325,681
MOTOR VEHICLE LIGHTING-SIGNALING SYSTEM
Loren W. Swensen, Bethlehem, Pa., assignor to Mack Trucks, Inc., Montvale, N.J., a corporation of New York
Filed Aug. 4, 1964, Ser. No. 387,276
2 Claims. (Cl. 315—83)

This invention relates generally to a system for motor vehicles such as trucks whereby one or more conventional exterior lights of the vehicle may be used for signalling purposes. More particularly, this invention relates to a system of such sort by which legal and recognizable signalling may be accomplished under all conditions of visibility.

In the highway operation of heavy trucks, it has become standard practice for drivers to signal other drivers, as is a matter of courtesy, by using the vehicle's head or marker lamps. For example, when one truck passes another, the driver being passed turns on his headlamp (daytime) or flashes his headlamps from low beam to high beam (nighttime), thereby signalling the passing driver that it is safe to return to the right hand lane. The passing driver normally "thanks" the other driver by blinking his marker lamps twice. Rapid flashing of the marker lamps is an indication to following drivers, whose visibility may be limited by the large area of the trailer, of danger ahead or of an impending stop. Those signals to other drivers are usually accomplished at present by operating the conventional separate head and marker lamp switches in the cab of the truck.

The use for signalling of the ordinary marker lamp and head lamp control switches has a number of disadvantages of which some are as follows. First, such switches may be inadvertently left in wrong position if the driver is interrupted while signalling. Further, the lack of a distinct signalling switch may lead to confusion as to which of the various switches in the truck cab should be operated in order to signal. Still further, during dawn or dusk visibility conditions when only the parking lights are on the actuation of the headlamp tilt ray switch with the intention of signalling will result in no signal. To overcome such disadvantages, it has been proposed in U.S. Patents No. 2,965,728 and 2,869,033 to Cherefko to provide a switch which is used for signalling only, and which is so incorporated in the lighting system of the motor vehicle that actuation of the switch effects a change under both day and night driving conditions in the light emanated from particular exterior lights on the vehicle.

According, however, to Cherefko's teachings, when the lights to be used for signalling are "on," the signal is produced by interrupting the current to the lights for a period which is only momentary, and which is often so short that the resulting "blink" of the lights is unrecognizable as a signal. Moreover, in the case of headlamp signalling, the turning off of the headlamps by interruption of the current thereto is, even for signalling purposes, an illegal practice in most or all states.

Another disadvantage of signalling in accordance with Cherefko's teachings is that, under night driving conditions, the driver lacks control over the signalling to the extent that there is no relationship between the duration of the signal and the time during which the signal switch is held at fully thrown "signalling position." Furthermore, the signal switch cannot be utilized to produce a signal by changing the illumination of the headlamps from low beam to high beam.

It is, accordingly, an object of this invention to provide a motor vehicle lighting-signalling system which is free of one or more of the above-noted disadvantages.

Another object of this invention is to provide a system of such sort in which night-signalling is accomplished by a signal switch connected in circuit with a lamp in a manner whereby the throwing of the switch to "signal" position changes the light output from that lamp for as long as the switch remains at that position.

Still another object of this invention is to provide a system of such sort in which headlamp signalling is obtained by means which does not interfere with the normal operation of the headlamps, but which at night is adapted to produce a signal by changing the headlamps from low beam to high beam.

These and other objects are realized according to the invention by providing signal switch means mounted within reach of the driver of a motor vehicle and throwable by that driver from an unactuated or "neutral" position to a "signal" position. Associated with the switch means is lamp means disposed on the exterior of the vehicle. The signal switch means is so connected in circuit with such lamp means that the throwing of the switch means from "neutral" to "signal" effects a change in the light from the lamp means which serves as a signal, and which continues for the full period that the switch means is at "signal" position. In this manner, the duration of the signal is under the full control of the driver of the vehicle. In the instance where the lamp means is one or more of the marker lamps for the vehicle, the throwing of the switch means to "signal" serves to turn the marker lamp means "on" when normally "off" (during the day) and to turn the marker lamp means "off" when normally "on" (at dawn, dusk or at night). In the instance where the said lamp means is provided by the headlamps of the vehicle, the throwing of the signal switch means to "signal" serves to turn "on" the high beam of the headlamps when either those headlamps are normally "off" (during the daytime) or only the parking lights are "on" (during dawn or dusk) or the headlamps are normally actuated to be at "low beam" (at night).

For a better understanding of the invention, reference is made to the following description of a representative embodiment thereof and to the accompanying drawing.

Referring now to the drawing, the reference numeral 10 designates a battery or other current source disposed in a truck or other motor vehicle. Battery 10 has its positive terminal connected to ground. The negative terminal of the battery is connected to a terminal 11 providing input means for the lighting system of the vehicle. That lighting system includes several marker lamps schematically represented in the drawing by the single marker lamp 12. The system also includes at least two head lamps schematically represented in the drawing by the single headlamp 13.

Connected between terminal 11 and marker lamp 12 is a marker lamp circuit 15 incorporating a circuit breaker 16 directly connected to terminal 11. Between elements 12 and 16, the circuit 15 is divided into two parallel branches 17 and 18. Normal lighting control of the lamp 12 is exercised by a marker lamp on-off control switch 19 having two switch sections 20 and 21 in, respectively, the branch 17 and the branch 18. The sections 20 and 21 are mechanically coupled together so that, when one is open, the other is closed.

The headlamp 13 is supplied with current by a headlamp circuit 25 connected between the headlamp and terminal 11 and having therein a circuit breaker 26 directly connected to that terminal. Between elements 26 and 13, the circuit 25 is divided into a right-hand or main branch 27 and a left-hand or signalling branch 28. The branch 27 includes an on-off signal single-pole double-throw head lamp actuating switch 30. Connected in series with switch 30 is a tilt ray switch 31 adapted to switch current in branch 27 selectively to one or the other of a low beam terminal 32 and a high beam terminal 33 for the headlamp 13. As shown, the left-hand signalling branch 28 is connected between high beam terminal 33 and circuit breaker 26 to provide a path for current between those elements when the circuit through that branch is closed.

Signalling effects are produced in the described lighting system by a signal switch 39 having four separate switch sections 41, 42, 43, 44 in, respectively, the branches 17, 18, 27 and 28. In the drawing the switch 39 is represented schematically as being comprised of a slide button 40 having a central unthrown "neutral" position and slidable in opposite directions away from "neutral" position to, respectively, a "marker lamp signal" position at which the switch is fully thrown and a "headlamp signal" position at which the switch is also fully thrown.

The slide button 40 has a central actuating portion 45 disposed between the respective ends 46 and 47 of left-hand and right-hand couplings 48 and 49 biased towards portion 45 by respective compression springs 50 and 51 so that the two couplings bear against opposite sides of a central stop 52. The switch sections 41 and 42 are coupled together by coupling 48 so that, when either one of those sections is closed, the other section is open. Likewise, the two switch sections 43 and 44 are coupled together by coupling 49 so that, when either of those latter switch sections is closed, the other section is open. As is evident, a movement of slide button 40 to the left (in the drawing) forces coupling 48 leftward against the bias of spring 50 without having any effect on the positioning of coupling 49, and, conversely, a movement of the slide button to the right (in the drawing) forces the coupling 49 rightward against the bias of spring 51 without having any effect on the positioning of coupling 48. Hence, the signal switch 39 is adapted to produce independent signalling effects in, respectively, the marker lamp circuit 15 and the headlamp circuit 25.

The representation herein of toggle switch 39 and its components is schematic for the reason that there are various spring-loaded toggle switch structures suitable for use in the shown system which are well known to the prior art, and which, hence, need not be described herein in detail.

The shown pair of stops 53 and 54 are adapted to limit, respectively, the leftward movement of coupling 48 (and button 40) and the rightward movement of coupling 49 (and button 40) to thereby determine, respectively, the fully thrown "marker signal" position of switch 39 and the fully thrown "headlamp signal" position for that switch.

The signal switch 39 is mounted within reach of the driver at a location near the steering wheel so that slide button 40 can be moved upward or downward from "neutral" position by the driver. When switch 39 is so mounted, upward movement of button 40 from "neutral" corresponds to the rightward movement which shifts the switch from "neutral" to "headlamp signal" position, and downward movement of button 41 corresponds to the leftward movement which shifts the switch from "neutral" to "marker signal" position. The electrical connections of switch 39 to the rest of the lighting system may be provided by wires (not shown).

Adverting again to the drawing, the described lighting-signalling system is shown in the daytime no-signal condition. For such condition, the various switches in the various circuit branches of the system are in the following states. The marker lamp control switch 19 is in rightward "off" position so that its switch section 20 and 21 are, respectively, open and closed. In the headlamp circuit, the actuating switch 30 is in rightward "off" or open position, and the tilt ray switch 31 is in rightward position to connect the circuit branch 27 to the low beam terminal 32 of headlamp 13. The slide button 40 of signal switch 39 is at its central "neutral" position and is urged to remain in that position by the spring loading provided by springs 50 and 51.

In the headlamp circuit, the signal switch sections 43 and 44 are closed and open, respectively, and headlamp 13 is "off" (unenergized by current from source 10) because branch 27 is rendered open by switch 30, and branch 28 is rendered an open circuit by the open switch section 44.

In the marker lamp circuit, the signal switch sections 41 and 42 are, respectively, closed and open so that the closed section 41 is in series in branch 17 with the open marker lamp switch section 20, and the open signal switch section 42 is in series in brach 18 with the closed marker lamp switch section 21. Thus, for the system condition shown in the drawing both of the marker lamp circuit branches 17 and 18 are open circuits, and the marker lamp 12 is "off" because no current can reach it from source 10.

The shown system operates as follows. Assume that under daytime driving conditions, the driver wishes to signal with the headlamps. To do so, the slide button 40 is moved by the driver rightward from "neutral" to full "headlamp signal" position against the bias of spring 51 communicated to the button 40 through coupling 49. Such rightward throwing of switch 39 drives coupling 49 rightward to close switch section 44 and to open switch section 43. The opening of section 43 has no significant effect in branch 27 (because switch 30 is open). The closing, however, of section 44 connects the current source 10 through branch 28 to the high beam terminal 33 to thereby turn "on" the high beam of headlamp 13 so as to provide a headlamp signal. When the driver wishes to terminate such signal, he merely releases button 40 to permit spring 51 to push coupling 49 and button 40 back to "neutral" to thereby restore the system to its previous daytime no-signal condition.

Alternatively, the driver may wish to signal by the marker lamps. In that instance, the button 40 is shifted leftward against the bias of spring 50 from "neutral" to full "marker signal" position to thereby drive coupling 48 left so as to close switch section 42 and open switch section 41. The opening of section 41 has no significant effect in branch 17 (because marker lamp switch section 20 in series with section 41 is already open). The closing, however, of signal switch section 42 completes a circuit for current from source 10 through branch 18 and the switch sections 42 and 21 therein to turn marker lamp 12 "on" so as to provide a marker lamp signal. As before, the driver terminates such signal by releasing button 40 to permit spring 50 to drive coupling 48 and the button back to "neutral" position to thereby restore the described system to its previous condition.

At dawn or dusk, the parking lights are "on" by being energized by current from source 10 through a circuit (not shown) separate from those which have been described. Moreover, the marker lamps are "on" as a result of throwing switch 19 leftward to "on" position to close switch section 20 and open switch section 21 so as to supply current from source 10 through branch 17 and the switch sections 41, 20 therein to marker lamp 12. For such dawn and dusk driving conditions, headlamp signalling is accomplished in the same manner as previously described. Marker lamp signalling is accomplished by the same motions of the driver as before, but the character of the signal is now different because the marker lamps are now normally "on." That is, when button 40 is now slid left to "marker signal" position, the resultant opening of switch section 41 and closing of switch 42 opens all the branches of the circuit from source 10 to marker lamp 12 (because marker lamp switch sections 20 and 21 are now closed and open, respectively, wherefore in each branch 17 and 18, one of the two serially connected switch sections therein is an open switch section). Hence, the marker lamp 12 is turned "off" to provide a signal by the extinction of the light from that lamp. Such extinction signal continues until the driver releases button 40, and the button and coupling 48 are thereafter driven by spring 50 back to "neutral," at which time signal switch 41 re-closes to re-establish a flow of current from source 10 through branch 17 to headlamp 12.

At night, the marker lamps are normally kept "on," as described, by marker lamp control switch 19. In the headlamp circuit, the headlamp actuating switch 30 is at its leftward "on" position to be closed. Ordinarily, the tilt ray switch 31 is at its shown rightward position to switch branch 27 to low beam terminal 32 so that the low beam of the headlamps is "on." For such night condition, signalling by the marker lamps is accomplished in the way just described for signalling with those lamps at dawn or dusk. For signalling with the headlamps, the same hand motions are used as before in that the driver shifts button 40 rightward from "neutral" to fully thrown "headlight signal" position. Such shifting of the button drives coupling 49 right (against the bias of spring 51) to open switch section 43 and close switch section 44 so as to open the circuit from source 10 through branch 27 to low beam terminal 32 and so as, further, to close the circuit from that source through branch 28 to high beam terminal 33. Accordingly, the light output from headlamp 13 changes from low beam to high beam to thereby provide the signal. In this connection, it is to be noted that, since the opening of switch section 43 and the closure of switch section 44 are substantially simultaneous, there is no instant of time at which the light output from the headlamp is extinguished.

As before, the headlamp signal continues for the time the driver holds switch 39 in "headlamp signal" position. To terminate the signal, the driver releases button 40 to permit spring 51 to drive coupling 49 and the button back to "neutral" to thereby restore the described system to its normal nighttime condition.

When, at night, the tilt ray switch 31 is thrown leftward to switch branch 27 to high beam terminal 33, an attempt to provide headlamp signalling by signal switch 39 would result in no signal, but, also, would not result in momentary extinction of the headlamps inasmuch as the opening of switch section 43 and the closing of switch section 44 are (as described) substantially simultaneous to thereby assure a substantially continuous supply of current to headlamp 13.

The described system has the advantages among others that the signals produced thereby are legal and (when properly made) of long enough duration to be clearly recognizable as signals, the duration of the signals is under the full control of the driver, and signalling by the headlamps can be effected without momentarily extinguishing the light output therefrom in the instance when the headlamps are normally at low beam. Moreover, mounting the signal switch near the steering wheel has the advantages among others that the driver need not remove his eyes from the road in order to signal, and less fatigue is involved in signalling because the driver does not have to lean out of his seat or shift his position in any way in order to signal.

The above described embodiment being exemplary only, it is to be understood that additions thereto, modifications thereof, and omissions therefrom can be made without departing from the spirit of the invention, and that the invention comprehends embodiments differing in form and/or detail from that specifically disclosed herein. For example, in some applications it may be desirable for the low beam of the headlamps when normally "on" (at night) to remain "on" while the high beam is turned "on" for signalling purposes. Such simultaneous "on" condition of the low and high beams can be realized (with appropriate internal circuits in the headlamps) by removing switch section 43 so that branch 27 is a permanently closed circuit from circuit breaker 26 to headlight actuating switch 30.

Accordingly, the invention is not to be considered as limited save as is consonant with the recitals of the following claims.

I claim:

1. A motor vehicle lighting-signalling system comprising headlamp means selectively capable of low beam and high beam actuation, marker lamp means, input means for current to said two lamp means, first switch means connected in circuit with and between said input means and headlamp means to exert off-on and low beam-high beam control over current from the former to the latter, second switch means connected in circuit with and between said input means and marker lamp means to exert off-on control independent of said first switch means over current from said input means to said marker lamp means, and signal switch means connected in circuit with said first and second switch means to selectively override the control of each without affecting the control of the other, said signal switch means being movable from an unthrown position to a first fully thrown position so as to provide high beam actuation of said headlamp means by said current when said first switch means calls for no current to or low beam actuation of said headlamp means, and said signal switch means being movable from said unthrown position to a second fully thrown position so as to establish and interrupt a flow of said current to said marker lamp means when said such second switch means calls for, respectively, no flow of current to and flow of current to said marker lamp means.

2. A motor vehicle lighting-signalling system comprising, headlamp means having low beam and high beam terminals, marker lamp means, input means for current to said two lamp means, a circuit comprised of a first branch connected between said input means and high beam terminal, a second branch connected between said input means and headlamp means, and third and fourth parallel branches each connected between said input means and marker lamp means, a tilt ray switch connected in said second branch to switch current therein selectively to one and the other of said terminals, a headlamp actuating switch in said second branch between said input means and tilt ray switch and having open and closed positions at which current therethrough is, respectively, interrupted and permitted, an off-on marker lamp control switch having a pair of switch sections of which each is in a respective one of said third and fourth branches and is movable between open and closed positions by movement of said control switch between "off" and "on" positions therefor, said sections being mechanically coupled so that one is open when the other is closed, and a signal switch movable from unthrown position to either one of first and second fully thrown positions, said signal switch having a first switch section in said first branch, a second switch section in said second branch between said input means and tilt ray switch, and third and fourth switch sections in, respectively, said third and fourth branches in series with the control switch sections therein, said first and second signal switch sections being mechanically coupled so that such first and second sections are closed and opened, respectively, only by movement of said signal switch from said unthrown position to said first thrown position, said third and fourth signal switch sections being each movable between open and closed positions only by movement of said signal switch between said unthrown position and said second thrown position, and said third and fourth sections being mechanically coupled so that when one is open the other is closed, and so that the one thereof which is closed when said signal switch is unthrown is in series with the one of said control switch sections which is open when said control switch is in the "off" position therefor.

References Cited

UNITED STATES PATENTS

| 529,532 | 11/1894 | Scribner | 315—361 |
| 2,655,642 | 10/1953 | Ayres et al. | 315—83 X |
| 2,932,814 | 4/1960 | Wilfert | 340—106 X |

JAMES W. LAWRENCE, *Primary Examiner.*

P. C. DEMEO, *Assistant Examiner.*